United States Patent
Beeson et al.

(10) Patent No.: US 7,797,828 B2
(45) Date of Patent: *Sep. 21, 2010

(54) ADAPTIVE MACHINING AND WELD REPAIR PROCESS

(75) Inventors: William J. Beeson, Laveen, AZ (US); Christopher L. Cahoon, Mesa, AZ (US); Greg Weaver, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 1181 days.

This patent is subject to a terminal disclaimer.

(21) Appl. No.: 11/413,706

(22) Filed: Apr. 28, 2006

(65) Prior Publication Data

US 2007/0251072 A1    Nov. 1, 2007

(51) Int. Cl.
   *B23P 6/00*    (2006.01)
(52) U.S. Cl. .................. 29/888.021; 29/888; 29/888.02; 703/2; 703/9
(58) Field of Classification Search .... 29/889–889.722; 703/2.9
   See application file for complete search history.

(56) References Cited

U.S. PATENT DOCUMENTS

| | | |
|---|---|---|
| 5,047,966 A | 9/1991 | Crow et al. |
| 5,204,824 A | 4/1993 | Fujimaki |
| 5,285,572 A | 2/1994 | Rathi et al. |
| 5,471,406 A | 11/1995 | Breyer et al. |
| 5,521,847 A | 5/1996 | Ostrowski et al. |
| 6,453,211 B1 | 9/2002 | Randolph, Jr. et al. |
| 6,543,134 B2 | 4/2003 | Meier |
| 6,568,077 B1 | 5/2003 | Hellemann et al. |
| 6,701,615 B2 | 3/2004 | Harding et al. |
| 6,884,964 B2 | 4/2005 | Murphy |
| 6,912,446 B2 | 6/2005 | Wang et al. |
| 7,472,478 B2 * | 1/2009 | Graham et al. .......... 29/888.021 |
| 2002/0128790 A1 * | 9/2002 | Woodmansee ............... 702/81 |
| 2005/0106998 A1 | 5/2005 | Lin et al. |
| 2005/0159840 A1 | 7/2005 | Lin et al. |
| 2006/0029723 A1 | 2/2006 | Rigney et al. |

FOREIGN PATENT DOCUMENTS

EP    1207004    5/2002

* cited by examiner

*Primary Examiner*—Rick K Chang
(74) *Attorney, Agent, or Firm*—Ingrassia Fisher & Lorenz, P.C.

(57) ABSTRACT

The present invention provides an apparatus and method for an adaptive machining and weld repair process useful for repairing airfoils, particularly damage to an airfoil leading edge and tip. The process first machines away damaged portions of the airfoil. Next, the actual profile of the airfoil subsequent to the removal of the damaged material is measured using a Coordinate Measuring Machine. The data is then used to generate a deformation profile. Filler material is then added to the machined area using the data of the deformation profile to produce an airfoil that approximates the ideal shape of a restored airfoil. At this point, the actual profile of the welded airfoil is measured using the Coordinate Measuring Machine. The data is then used to generate a deformation profile and the airfoil is machined using the date of the deformation profile to produce that shape. The adaptive technology minimizes the amount of stock on material that needs to be removed by hand. The technique thereby significantly reduces costly manual processing.

20 Claims, 5 Drawing Sheets

ADAPTIVE MACHINING AND WELD REPAIR PROCESS

FIELD OF THE INVENTION

The present invention relates to adaptive machining and weld repair. More specifically, the invention relates to the use of a computer-operated coordinate-measuring machine (CMM) to obtain data for programming an automated welding system used in the repair of impellers and blisks in gas turbine engines.

BACKGROUND OF THE INVENTION

Turbine engines may be used as a primary power source, such as in aircraft, or as a secondary, or auxiliary, power source to drive air compressors, hydraulic pumps, industrial gas turbine (IGT) power generators, or the like. In addition, turbine engines may be used as a stationary power supply, such as in a backup electrical generator for hospitals, and the like.

In a typical gas turbine engine, compressed air is generated by an axial and/or a radial compressor, and subsequently mixed with fuel and ignited. As a result, high velocity combustion gases are generated and directed against a plurality of stationary turbine vanes in the turbine engine. The stationary turbine vanes direct the high velocity gas flow to impinge on a plurality of turbine blades mounted on a rotatable turbine disk. The force of the impinging high velocity gas causes the rotatable turbine disk to spin at a high speed and thus generate power. In jet propulsion engines, the power created by the rotating turbine disk is used to draw more air into the engine and the high velocity combustion gas is passed out of the gas turbine aft end to create forward thrust. Other engines use the generated power to turn one or more propellers, fans, electrical generators, or other devices.

Engineers have progressively pushed turbine engines to extreme operating conditions in an attempt to increase the efficiency and performance of the turbine engines. Extreme operating conditions, such as high temperature and high pressure conditions are known to place increased demands on engine components, manufacturing technologies, and new materials used in the turbine engines. Increased strength and durability of some of these new materials has led to a gradual improvement in turbine engine design, but with these changes in engine materials, there has arisen a corresponding need to develop new repair methods appropriate for such materials.

Through normal service, there arises a need to repair turbine engine components such as turbine impellers and blisks. With respect to blisks, blade leading edge damage is fairly common, since the leading edge may be subject to foreign object damage or erosion after a period of service time. A significant savings can be realized if the damaged blades can be repaired and returned to service in lieu of blade replacement. Historically, the repair has been accomplished by machining away the damaged portion of the blades. Welding material was then manually deposited over the areas that had been machined away. The component was then mechanically machined by referencing a nominal model geometry in an attempt to reproduce the originally designed dimensions. Next, the component was hand finished by manually machining in order to place the component in a serviceable condition.

However, there are shortcomings associated with this historical repair method. The method may require leaving a significant amount of remaining material after mechanical machining, which must then be removed by a hand finishing process. The manual nature of the hand finishing process can be expensive and laborious and may thus result in an increase in the cost and processing time of the repair. The method may also result in significant scrap material. Thus, a need exists for the development of improved machining and weld repairing methods.

Accordingly, it is desirable to provide an improved method of repairing degraded gas turbine engine components. In addition, it is desirable to provide a repair method that can restore the approximate geometry, dimension and desired properties of the degraded gas turbine engine components. Finally, it is desired to provide a repair method that is less costly as compared to the alternative of replacing worn parts with new ones. The present invention addresses one or more of these needs.

SUMMARY OF THE INVENTION

The present invention provides a method for use in an adaptive weld repair process. In one embodiment, and by way of example only, there is provided a method for restoring a worn engine component comprising the steps of removing damaged material from a worn surface of the component thereby exposing a weld surface, measuring the component at the weld surface to generate a first plurality of component measurements, developing a first deformation component geometry based on the first plurality of component measurements, depositing a filler material on the weld surface, measuring the component at a surface of the filler material to generate a second plurality of component measurements, developing a second deformation component geometry based on the second plurality of component measurements; and machining the component to the second deformation component geometry.

In a further embodiment, still by way of example only, there is provided a method for restoring a worn edge of an airfoil comprising the steps of: machining away damaged material from a damaged airfoil edge so as to expose a weld surface; measuring the damaged airfoil edge at the weld surface using a CMM system to generate a plurality of component measurements; developing a first deformation component geometry based on the plurality of component measurements; depositing a filler material on the weld surface according to the first deformation component geometry so as to create a weld-repaired airfoil having actual dimensions; measuring the actual dimensions of the weld-repaired airfoil using a CMM system so as to generate an actual geometry; developing a second deformation component geometry based on the actual geometry; and machining the component according to the second deformation component geometry.

In still a further embodiment, and still by way of example only, there is provided a method for restoring a worn edge of an airfoil comprising the steps of: machining away damaged material from a damaged airfoil edge so as to expose a weld surface; defining a set of streamlines on the airfoil surface; defining a set of cross curves that intersect one or more of the streamlines thereby establishing surface points at each such intersection; associating nominal surface data with each surface point; defining a set of inspection nominal points that fall on streamlines and cross curves; measuring the damaged airfoil edge at the weld surface using a CMM system to generate a plurality of component measurements; interpolating the shape deviation data with reference to the surface points so as to create a first deformation geometry based on the plurality of component measurements; converting the first deformation geometry to a welding system operable code; depositing a filler material on the weld surface according to the first deformation geometry so as to create a weld-repaired airfoil; automatically measuring the dimensions of the airfoil using a CMM system at each inspection nominal point to establish shape deviation data; interpolating the shape deviation data with reference to the surface points so as to create a second deformation geometry; converting the second deformation geometry to a machine operable code; machining the component according to the second deformation geometry; and hand finishing the airfoil.

Other independent features and advantages of the adaptive machining and weld repair process will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
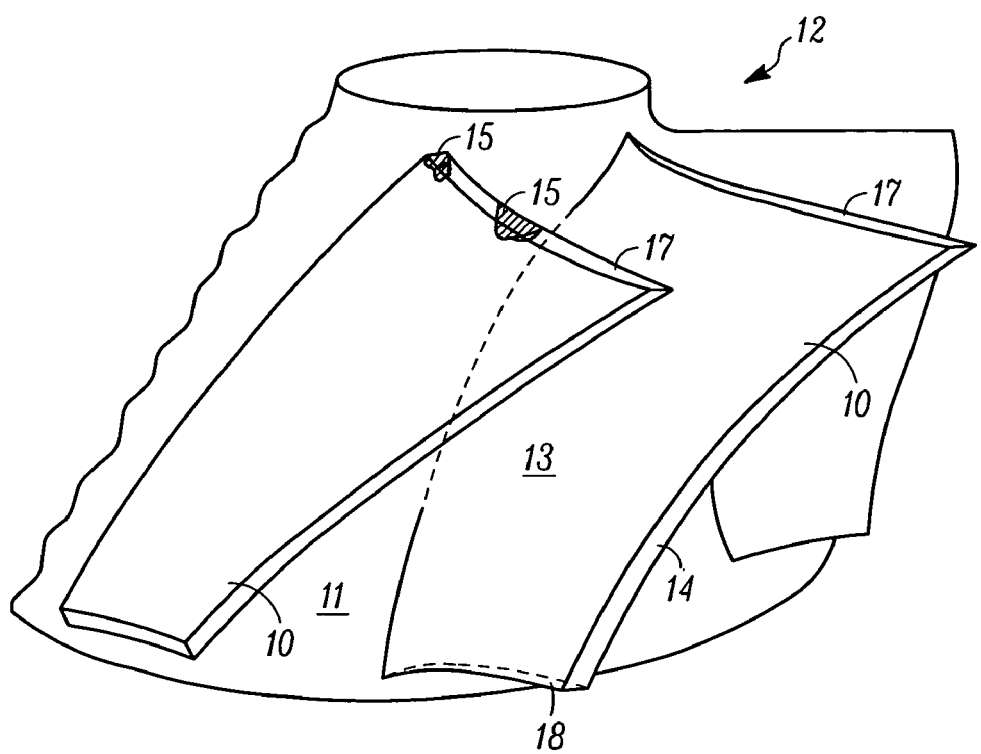
FIG. 1 is a perspective view of a gas turbine engine blisk showing a damaged leading edge that may be repaired according to an embodiment of the present invention.

Referring to the drawings, FIG. 1 is a diagram illustrating an airfoil or blade 10 of a turbine blisk, or impeller, 12 of a turbine engine. It should be understood that the terms airfoil and blade are used interchangeably throughout the text. Airfoil 10 is typically welded to or cast in unitary form with a hub 11, extending radially outwardly from the hub 11. In this particular blisk 12, multiple such turbine airfoils 10 are positioned in adjacent circumferential position along the hub 11 or rotor disk. The airfoil 10 is typically a few inches in length and may have a different geometry and/or design than that illustrated, depending on the particular engine model in which it will be used and on its application. In general, the airfoil 10 is characterized by a complex geometry that changes in three dimensions. As illustrated, airfoil 10 is a cuplike structure that includes a concave face 13 and a convex face (not shown) on the reverse side of the airfoil 10. A top edge 14 defines the radial end of the airfoil 10.

During operation, gases impinge on the concave face 13 of the airfoil 10 generating pressure on the concave face 13 and suction on the convex face. These pressure and suction forces acting on the surfaces of the airfoil 10 cause the hub 11 to rotate. The turbine airfoil 10 additionally includes a leading edge 17 and a trailing edge 18 which represent the edges of the airfoil 10 that firstly and lastly, respectively, encounter an air stream passing around it. The leading edge 17 is subject to wear and degradation that partly arises from debris and contaminants that may be carried in the air stream. This debris impacts the leading edge 17 at high velocity thus leading to nicks, wear, and erosion, generally referenced as damaged material 15, all of which impair the engine performance. The top edge 14 is also subject to wear due to both particulate erosion and rubbing against adjacent engine structures. Other portions of the airfoil 10, including the trailing edge 18, are subject to erosion (not shown) due to the harsh environment of the engine.

The airfoil 10, as a result of this described wear and degradation, requires repair or replacement to restore engine performance. One repair scheme calls for the removal of the blisk, or the impeller, 12 after a given period of use. At this time damage to the airfoils 10 may be repaired, including repair and restoration of the airfoil leading edge 17, the top edge 14, and the trailing edge 18.

Figure 2:
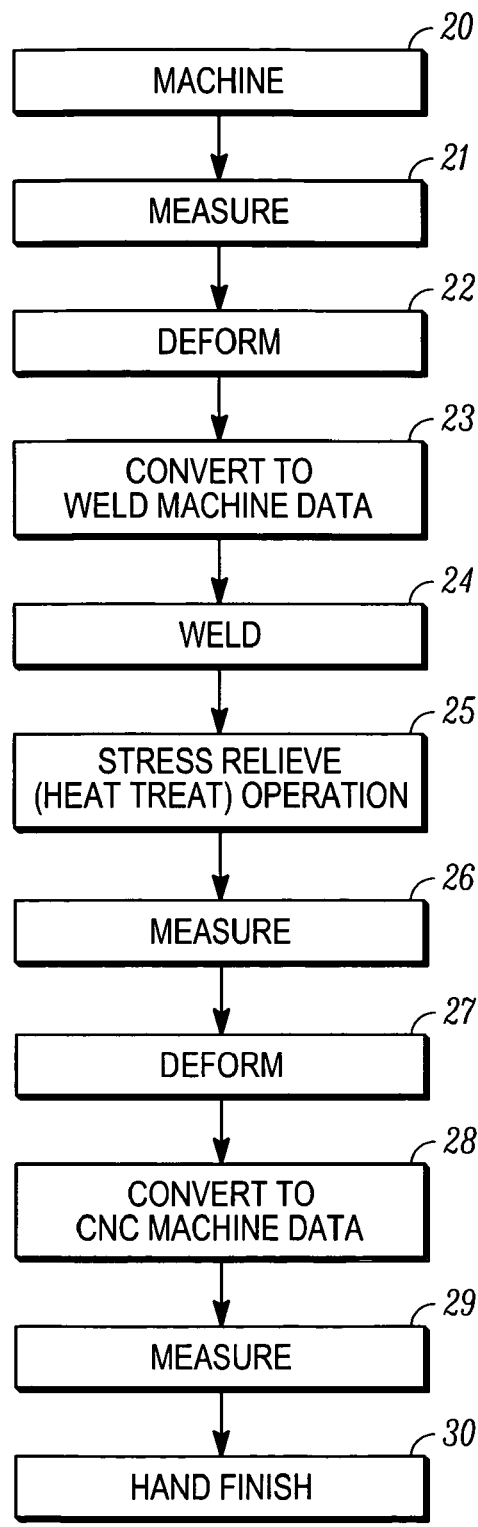
FIG. 2 is an exemplary block diagram showing steps in an adaptive machining and weld repair process according to an embodiment of the present invention.
Figure 3:
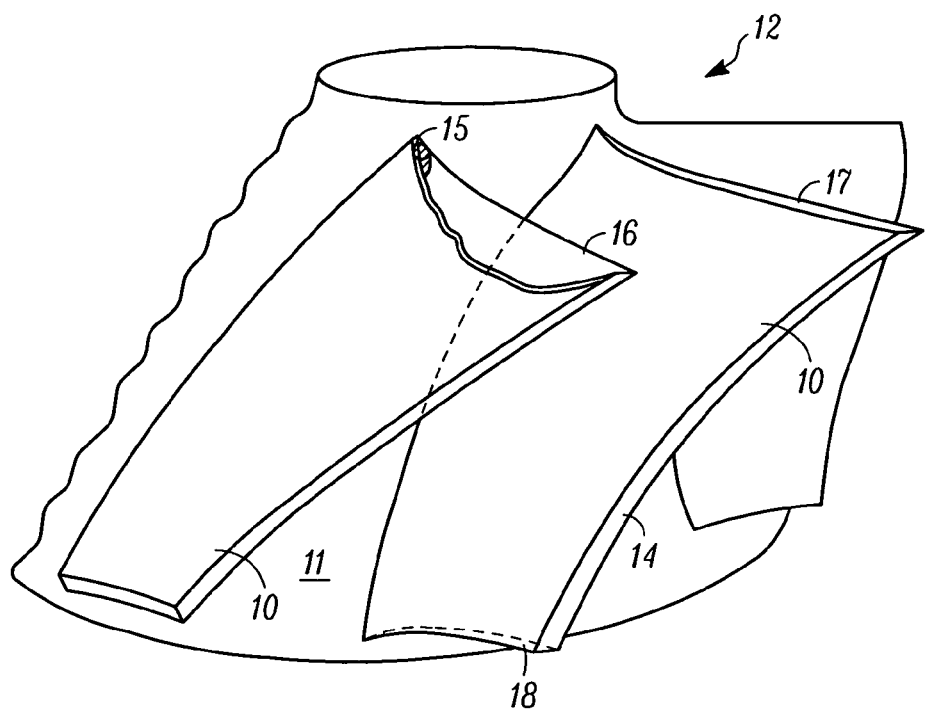
FIG. 3 is a perspective view of a gas turbine engine blisk during repair according to an embodiment of the present invention.

Referring now to FIG. 2 illustrated is a set of steps in a preferred repair process. In a first step 20, damaged material on an engine component is machined. As best illustrated in FIG. 3, a damaged leading edge 17 of the blisk 12 is machined to remove the damaged material 15. The remaining material that forms the airfoil 10 should not suffer from any degree of damage that would prevent a restored airfoil from returning to service. In a preferred embodiment, the leading edge 17 (or other damaged area such as a tip) is machined back to predetermined limits. The limits may refer to a degree of machining in a lateral direction starting from the leading edge 17 and a depth direction starting at the top edge 14 of the airfoil 10. When an automated machining operation is to be used, it is preferred that all the airfoils 10 be machined to the same limits. The limits of machining may be determined by an inspection step of the airfoils 10. Known methods of machining or grinding may be used for the material removal, but it is preferably done by automated means using a multi-axis numerically controlled milling machine.

The portion of the airfoil 10 that has been cut away leaves a newly exposed area on the substrate region of the airfoil 10, as best seen in FIG. 3, where a portion of the damaged material 15 has been removed. The cut away portion thus reveals a weld surface 16 on a substrate region of the airfoil 10. The weld surface 16 generally follows a contour of a leading edge 17, the trailing edge 18, or the top edge 14, depending on where the repair is to be performed.

In a next step 21, the blisk 12 is inspected and measured using a Coordinate Measuring Machine (CMM) inspection and measuring process. The CMM inspection determines a first plurality of component measurements of the deformed geometry of the blisk 12 as a result of the removal of the damaged material 15. The data, and more specifically the first plurality of component measurements, obtained during the CMM inspection and measuring process will enable the generation of a plurality of tool paths for the programming of an automated welding system. Thus, for example, the CMM process inspects and determines, for each airfoil or blade, the deformed geometry and aids in establishing the actual airfoil 10 position. The subsequent deposition and welding of new filler material (not shown) to the blisk 12 is achieved by an automated welding system, having been programmed in light of the data retrieved by the CMM inspection.

CMM technology is a commercially available system that is able to take precision measurements quickly. A typical machine includes a probe and the related mechanical device (such as an arm, beam, gantry, or combination) to place the probe in a desired location. Physical probes can be used to take measurements at desired points; alternatively lasers and other optics can be used as the means to take the measurements. A CMM platform further includes software whereby measurement data can be recorded, saved, and otherwise digitally manipulated. Measurements can be recorded automatically or manually, though automatic operation is preferred. One preferred form of CMM technology is available through the Zeiss Prismo CMM inspection platform.

In a next step 22, the first plurality of component measurements is transferred to a blade deformation process, and a first or initial blade geometric deformation is performed. In qualitative terms, the blade deformation step is the process of comparing the nominal (blueprint) airfoil geometry with the actual geometry of the airfoil 10 as measured by the CMM. In comparing these two sets of data a third set of data is developed. The third set of data, defining a deformation geometry, in effect provides an interpolation of the measured data. The interpolated or "deformation" data is spread out so as to apply to the various positions that are needed to define a blade face. In this way this initial deformation geometry defines a new blade geometry. The deformation geometry, in a next step 23, is converted to weld machine data and provides for programming of tool paths in the automated welding system. The data for the new, deformed blade geometry is transferred to welding software. The welding software converts the geometric data into welding commands. The welding software, using the deformation data, generates tool paths in order to weld the filler material to the blade. A typical tool path may call for multiple deposition passes over the leading edge, with each pass depositing a portion of the weld, or filler, material.

The use of the deformation geometry data makes the welding step more accurate and efficient so as to minimize the amount of stock on material that will later need to be machined away.

Figure 4:
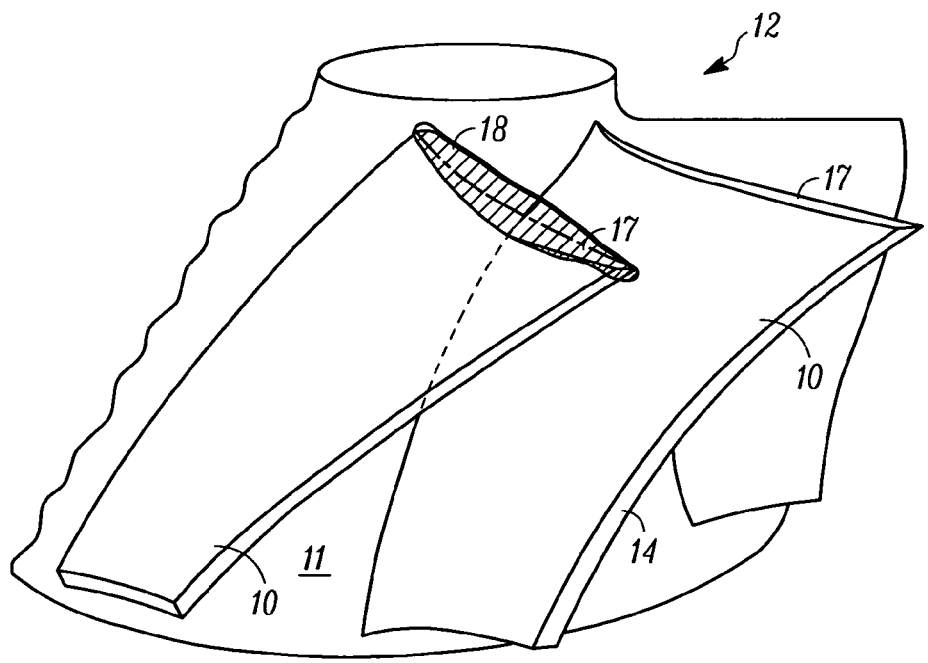
FIG. 4 is a perspective view of a gas turbine engine blisk during repair according to an embodiment of the present invention.

In a next step 24, the weld process is executed. More specifically, a filler material 18 as illustrated in FIG. 4 is deposited by automated welding techniques on the exposed weld surface 16 in light of the previous CMM inspection and measuring process. It is generally preferred that laser welding techniques be followed, especially with respect to the superalloys and titanium alloys used in gas turbine engine components. Preferably, the filler material 18 is deposited through the, use of powder fusion welding. In this system, the filler material 18 in powder form is discharged so that it is melted by the laser beam and welds on the desired surface of the workpiece. As is known in the welding art, weld paths and welding parameters are chosen to control thermal input during the welding operation. It is preferred to minimize the amount of heat discharged through the laser to the minimum amount necessary to affect laser welding. Further, the area of the laser beam spot and laser velocity are similarly determined in order to regulate the heat experienced by the substrate. Laser welding is well suited to this kind of control. Thus, the welding operation avoids microcracking in the weld area and the heat affected zone.

Multiple automated passes may be used to build up a required dimension of the filler material 18 where one pass overlaps a previous pass and successive passes are laid atop a previous pass. Similarly, the method allows for cladding of an area greater than that covered in a single pass by laying successive passes alongside previous passes thus covering a desired area. If needed, repetitions of the laser welding passes can be done in order to achieve a required level of buildup and/or coverage over a required area; this is accomplished by depositing successive layers of filler material 18 on top of one another. Upon conclusion of a first pass, or other passes, the controller can check the thickness of the weld deposit. If needed, additional weld depositions can then be conducted.

Automated welding depositions continue until sufficient filler material 18 has been deposited. Sufficient filler material 18 is deposited when the deposited filler material 18 occupies the volume of damaged material that had been machined away from the airfoil 10. Thus, deposited filler material 18 preferably extends to a point beyond the leading edge 17 and the top edge 14 of the airfoil 10 in its original condition. The result is a mass of newly deposited filler material 18 that occupies a repaired region.

In a next step 25, the blisk 12, and more particularly filler material 18 undergoes a stress relieve (heat treat) operation to remove residual stress induced during the weld operation. This allows the material (blisk 12 and material 18) to assume a stable geometric position and a more uniform metallic substructure.

In a next step 26, the newly welded piece is analyzed by a second CMM inspection process that results in a second plurality of component measurements. The second CMM inspection determines the location of undamaged material (including the new filler material 18) on the blisk 12. Thus, for example, each blade or airfoil 10 of the impeller or blisk 12 is inspected. The second CMM process step 26 determines, for each airfoil 10, the location of undamaged material.

In a next step 27 the second plurality of component measurements is transferred to a blade deformation process, and a second blade geometric deformation is performed. Again, the nominal (blueprint) airfoil geometry is compared with the actual geometry of the airfoil 10 as measured by the CMM subsequent to the deposition of the filler material 18 by welding. These two sets of data are compared to develop a third set of data. The third set of data defines a deformation geometry that in effect provides an interpolation of the second plurality of component measurements and defines a new blade or airfoil geometry. The new blade geometry is thus close to the shape of the blueprint geometry while taking into account the second plurality of component measurements. The deformation geometry is then useful in making the later machining steps more accurate and efficient so as to minimize the amount of the filler material 18 that must be hand finished on a final restored airfoil.

Figure 5:
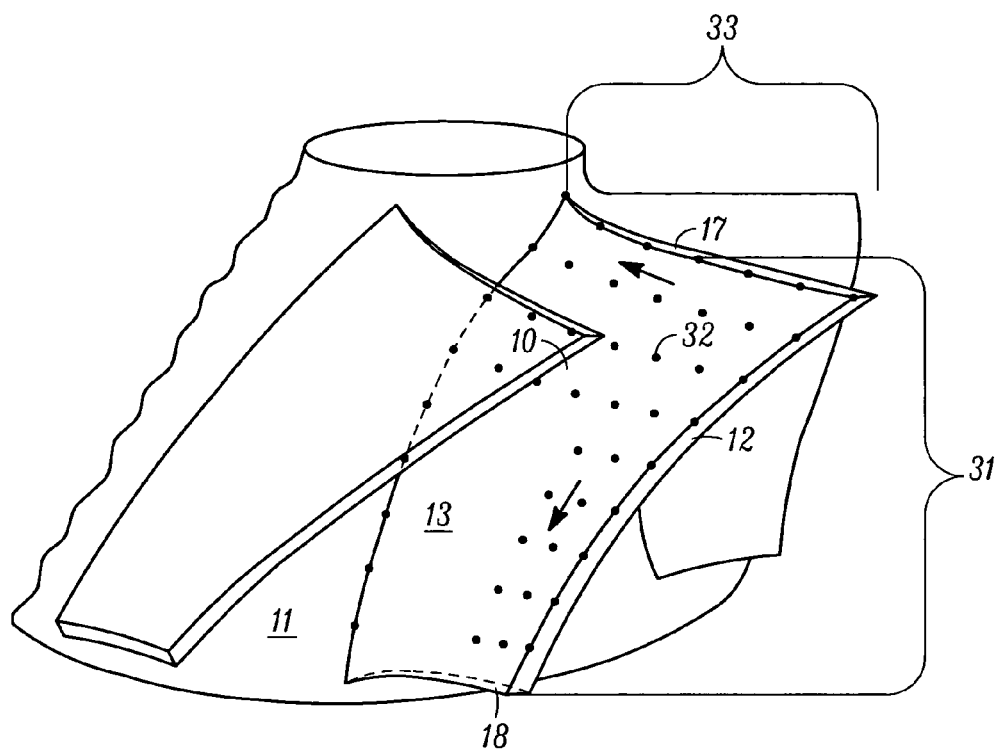
FIG. 5 is a perspective view of an impeller airfoil showing streamlines and cross curves thereon.
Figure 6:
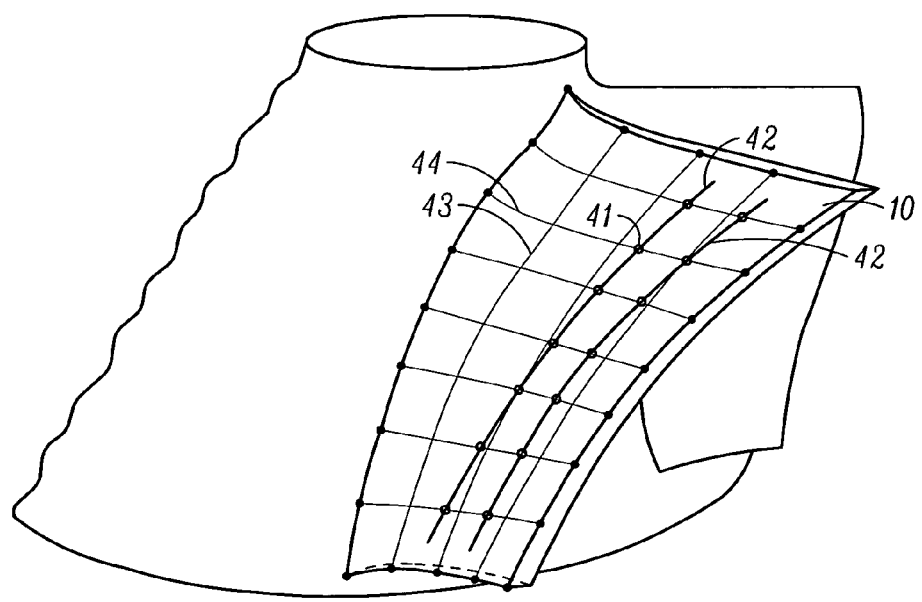
FIG. 6 is a perspective view of an impeller airfoil showing streamlines, cross curves, and inspection curves thereon.

A preferred embodiment of processing steps in the deformation methods previously mentioned is described with respect to FIGS. 5 and 6. Each deformation process first uses a set of assumptions to define the nominal airfoil blade surface. A blade surface of the airfoil 10 is defined by a sequence of point curves, referred to as streamlines 31 and cross curves 33 of the surface. The points 32 of the streamlines 31 are ordered from the leading edge 17 to the trailing edge 18 of the airfoil 10. The streamlines 31 are ordered from the top edge 14 of the airfoil 10 to the hub 11. The streamlines 31 for the airfoil 10 have the same number of points 32. Thus, for a given program, a streamline 31 has M number of points 32. The sequence of corresponding points 32 of each streamline 31 defines a point curve referred to as a cross curve 33 of the surface. A corresponding point is, for example, the set of $5^{th}$ points of each streamline 31, or the set of $10^{th}$ points of each streamline. Thus, a given point 32 on a streamline 31 is also a point 32 on a cross curve 33. By convention, cross curves 33 run vertically, generally parallel to the blade, the leading edge 17, and the trailing edge 18. Streamlines 31 run generally horizontally, roughly parallel to top edge 14. The points 33 of the cross curves 33 are ordered from the top edge 14 to the hub 11. The cross curves 33 are ordered from the leading edge 17 to the trailing edge 18.

As shown by arrows in FIG. 5, streamlines 31 and cross curves 33 extend from the top edge 14 to the hub 11, and from the leading edge 17 to the trailing edge 18, respectively, such that the blade surface is covered by sufficient points 32 to describe the blade geometry. What results is a matrix of data. Thus, if there are N streamlines 31 of M points 32, there are M cross curves 33 of N points 32. The consecutive points 32 on each streamline 31 are set close enough that the line segment joining the consecutive points 32 lies within a defined tolerance of the surface. Likewise, the consecutive streamlines 31 are set close enough so that a line segment joining the corresponding points 32 between the consecutive streamlines 31 lies within a defined tolerance of the surface. A surface normal vector at each point of the surface (each point 32 on a streamline 31 or a cross curve 33) is determined by computing the cross product of the tangent vectors of the streamline 31 and the cross curve 33 that pass through the point 32.

Finally, the blueprint or nominal data that defines the blade is associated with the points 32 of the airfoil surface. Thus, the points also have information associated with them that define a designed or specified airfoil shape. However, as is known in the industry, the actual shape of the airfoil may not correspond to the nominal data. For a variety of reasons, perhaps the shape has been altered during use, or perhaps the airfoil was not manufactured as designed.

In a next series of steps, data is developed that reflect the actual, measured geometry of the airfoil or blade. The actual data is connected to inspection nominal points, which are positions on the streamline curves and cross curves, though inspection nominal points need not correspond to surface points 32.

As shown in FIG. 6, a set of inspection nominal points 41 define inspection curves 42. As illustrated, the inspection curves 42 thus intersect the streamlines 43 and the cross curves 44 at the inspection nominal points 41. In one embodiment, an inspection nominal point is a known point where there has been an inspection and is also a point that lies on a streamline curve or a cross curve. Any method may be used to set an inspection nominal point so long as it satisfies the definition criteria.

In a second embodiment, inspection nominal points are computed. This is accomplished by calculating the geometric intersection of surfaces of revolution with the streamlines and the cross curves. The points of intersection are inspection nominal points. The inspection nominal points, by definition, lie on a streamline or a cross curve. The surface of rotation used in the geometric intersection is preferably a rotation of a curve that is patterned from a known engine component, for example a shroud. A curve may be defined by projecting points a set distance normal to the shroud curve, along a plane run through the center line of the engine. This projection curve is then rotated about the center line. The rotation is a three dimensional constructed surface of rotation. A series of surfaces of rotation may be defined by first defining a set of curves that are at varied normal distances from the shroud curve. In one embodiment, by way of example only, a set of curves are defined by setting points 50, 100, 150, 200, 250, etc. thousandths of an inch normal to the shroud curve. In this manner, surfaces of revolution can be constructed that will intersect with streamlines and cross curves of the nominal blade. The points of intersection are inspection nominal points. It will be noted that, by definition, inspection nominal points lie on streamlines and cross curves; however, they need not be the same as the surface points 32.

Other means may be used to define a surface of rotation. Any curve which can describe a surface of rotation that intersects with blade streamlines and cross curves may be used to define the surface of rotation. In an alternative embodiment, curves to be rotated are established by measuring a set distance normal from the centerline of the blisk or impeller. In still a further embodiment, curves to establish a surface of rotation are defined by setting points on some function curve that is projected from an engine structure such as a center line or shroud. As will be further explained below, the surface of rotation may be constructed so as to obtain intersections, and thus inspection nominal points, at preferred locations with respect to the airfoil surface.

In a next step, the actual airfoil 10 is measured at inspection nominal points. It will be appreciated that the preferred process of setting an inspection nominal point (intersecting a surface of revolution with a streamline and cross curve) is done so that the inspection nominal point is set at a position that may be referenced by a CMM system. Thus, for example, by setting a given surface of revolution 250 thousandths of an inch from a shroud, this also sets a spatial position that can be mimicked or identified by the CMM system. In this manner the CMM system takes measurements at the defined inspection nominal points. Actual data is thus associated with these inspection nominal points.

It will be appreciated that the greater the number of inspection nominal points, the better will be the measurement of the actual shape of airfoil 10. However, an increased number of inspection points carries increased time and expense, and further requires increased calculation capacity. Thus, it is preferred in one embodiment to have only so many inspection nominal points as is needed to adequately define the actual airfoil curvature in the region of the edge repair.

A final set of calculations develops the deformation geometry. In summary this comprises taking actual data associated with each inspection nominal point, and then interpolating values to be associated with each streamline or cross curve point that lies adjacent to the inspection nominal point. Linear interpolation is preferably used, though other interpolation systems are also acceptable. A distribution of deviations is thus computed along the streamlines and cross curves by linearly interpolating the deviations using the polygonal arc length as the independent variable. The points of the deformed surface are computed by projecting at each surface point the deviation along the surface normal unit vector.

The deformation system includes a preferred approach for dealing with edge conditions on the airfoil surface. In order to construct a blade shape based on actual data, it is desired to measure inspection points on the unwelded surface of the blade. That portion of the blade that has welding material on it, for example near one of the edges, would not conform to a smooth airfoil shape because of the welding material. Thus, the blade is not measured where it has been welded. Thus, in setting the inspection points, it is preferred to begin some set distance away from an edge feature. For example, inspection points may be set to begin 0.100 inch away from an edge in order to avoid welding material. The first inspection point therefore begins some set distance away from the edge feature. Then, when calculating deviations, the surface points beyond the "first" inspection point (points between the "first" inspection point and the edge feature) are assumed to have the same deviation as the "first" inspection point. Data interpolation is calculated using that assumed deviations. Similarly, the deviations for the points beyond any "last" inspection point are assumed to be the deviation of the "last" inspection point. Alternatively for the points beyond the last inspection point, the deviations are the obtained by interpolating between the deviation at the last inspection point and zero (0.0) unless a boundary deviation condition has been defined to be used in place of zero (0.0). When this step is completed, a deviation has been defined for each point of the surface.

It will be noted that in this deformation method the tip feature is generally parallel with the streamlines. To improve computational stability, the intersection calculations in the tip area use the surface cross curves. Similarly the leading edge 17 and the trailing edge 18 features are generally parallel with the cross curves 44. To improve the computational stability, the intersection calculations in the area of the leading edge 17 and the trailing edge 18 use the surface streamlines 31.

Referring again to FIG. 2, the next step in the adaptive machining and weld repair process is step 28. The data for the new, deformed blade geometry is transferred to machining software. The machining software converts the geometric data into machining commands. Preferably, it is machining software that enables a CNC code to direct customized machining. The machining software, using the deformation data, generates tool paths in order to machine the welded blade. A typical tool path may call for multiple machining of a leading edge, with each machining pass removing portions of the weld material.

In step 29, the machining step is executed. The airfoil is machined to the best theoretical shape. It is preferred to perform this machining such that it leaves less than 5 thousandths of an inch (0.005") of material stock on.

Figure 7:
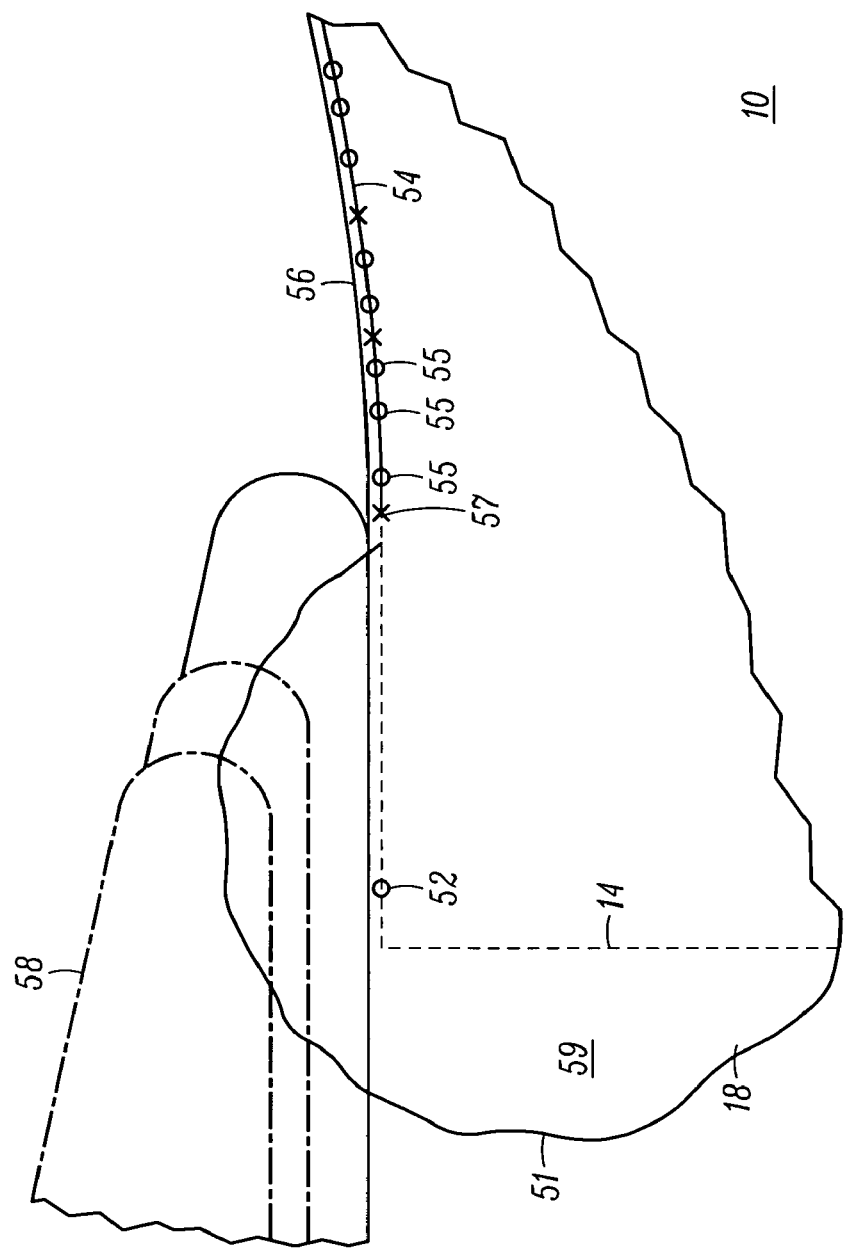
FIG. 7 is a close up view of an impeller airfoil showing a welding bead, an ideal geometry, a deformation geometry, and exemplary machining steps according to an embodiment of the present invention.

Several features of the adaptive machining and weld repair process, including the machining step, are illustrated in FIG. 7. An airfoil 10 is illustrated in cross-section, viewed head-on from the leading edge 17 of the impeller 12. Thus, the airfoil 10 shape illustrated is not the leading edge 17, but rather is a cross-section taken at some mid-point of the airfoil 10. The airfoil top edge 14 has been welded, and a weld bead 51 of filler material 18 rests on the airfoil 10. An ideal contour 52, illustrates the hypothetical blueprint structure of the airfoil 10. This ideal contour includes the airfoil top edge 14 and a profile edge 54. The profile edge 54 thus corresponds to a cross curve of the ideal geometry. Surface points 55 are illustrated on the cross curve. Depicted slightly above the ideal contour 52 is the actual contour 56. Thus, in this example, the airfoil 10 has a shape that does not match the ideal shape. Inspection points 57 are also noted on the ideal contour with X's. In this particular embodiment, numerical values, +0.005, +0.004, +0.003, etc., are associated with each inspection point. These numerical values indicate the measured deviation at the inspection points between the ideal and actual shapes.

Still referring to FIG. 7, there is also shown how a deformation contour is extended to that portion of the airfoil 10 that is presently covered by the weld bead 51. It is noted that measurements for actual data are preferably taken at locations where no filler material 18 has been deposited. Thus, for that small portion of the airfoil 10 covered by welding, or filler, material 18, a deformation curve must be extended, from that portion of the deformation curve where actual data has been measured and interpolated, as described in the deformation process.

FIG. 7 also illustrates exemplary machining steps that may be ordered. The goal is to machine the airfoil 10 to a best possible shape that is consistent with the actual data, while also leaving a minimum of material stock on airfoil 10. A cutter 58 is illustrated in shadow. The series of cutters 58 merely illustrates the hypothetical succession of cutting steps. Thus, in a first pass cutter 58 removes one portion of weld bead 51. The weld bead 51 is further trimmed in a next step. Finally, weld bead 51 is trimmed down to a point that closely approximates the deformation line. Thus, a blade shape is produced with little material left for hand finishing, and its shape, where machined, is also consistent with the actual configuration of the airfoil 10. It is finally noted that the portion of the weld bead 51 in FIG. 7 that is to the left of the top edge 14, noted as region 59, is preferably trimmed in a separate operation. This trimming of the top edge 14 is preferably done to a set height curve.

At this point, step 30, the engine component may be hand finished. However, the amount of manual machining that is needed is reduced from methods that do not employ development of a deformation geometry. Preferably, less than 0.005 inch of the filler material 18 is left over the deformation surface.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for restoring a worn engine component comprising the steps of:
   removing damaged material from a worn surface of the component thereby exposing a weld surface;
   measuring the component at the weld surface to generate a first plurality of component measurements;
   developing a first deformation component geometry based on the first plurality of component measurements;
   depositing a filler material on the weld surface;
   measuring the component at a surface of the filler material to generate a second plurality of component measurements;
   developing a second deformation component geometry based on the second plurality of component measurements; and
   machining the component to the second deformation component geometry.

2. The method according to claim 1 wherein the steps of measuring the component further comprises measuring using a coordinate measuring machine (CMM).

3. The method according to claim 1 further comprising the steps of generating a first tool path in response to the first deformation component geometry and generating a second tool path in response to the second deformation component geometry.

4. The method according to claim 3 wherein the step of generating a first tool path comprises generating a tool path for automated welding of the filler material to the weld surface.

5. The method according to claim 3 wherein the step of generating a second tool path comprises generating a tool path for automated machining of the filler material.

6. The method according to claim 1 wherein the step of depositing a filler material comprises laser cladding.

7. The method according to claim 1 wherein the step of machining the component includes machining the component so as to leave less than 5 thousandths of an inch stock on.

8. The method according to claim 1 further comprising the step of hand finishing the machined component.

9. A method for restoring a worn edge of an airfoil comprising the steps of:

machining away damaged material from a damaged airfoil edge so as to expose a weld surface;
measuring the damaged airfoil edge at the weld surface using a CMM system to generate a plurality of component measurements;
developing a first deformation component geometry based on the plurality of component measurements;
depositing a filler material on the weld surface according to the first deformation component geometry so as to create a weld-repaired airfoil having actual dimensions;
measuring the actual dimensions of the weld-repaired airfoil using a CMM system so as to generate an actual geometry;
developing a second deformation component geometry based on the actual geometry; and
machining the component according to the second deformation component geometry.

10. The method according to claim 9 further comprising the step of converting the first deformation geometry to automated welding data.

11. The method according to claim 10 wherein the step of depositing a filler material on the weld surface further comprises automated welding according to the automated welding data.

12. The method according to claim 9 further comprising the step of converting the second deformation geometry to CNC machining data.

13. The method according to claim 12 wherein the step of machining the component further comprises automated machining according to the CNC machining data.

14. The method according to claim 9 wherein the step of machining away damaged material from a damaged airfoil edge comprises machining away a damaged leading edge.

15. The method according to claim 9 wherein the step of machining away damaged material from a damaged airfoil edge comprises machining away a damaged trailing edge.

16. The method according to claim 9 wherein the step of machining away damaged material from a damaged airfoil edge comprises machining away a damaged top edge.

17. The method according to claim 9 wherein the steps of developing a first deformation component geometry and a second deformation component geometry further comprises:
defining a set of streamlines on the airfoil surface;
defining a set of cross curves that intersect one or more of the streamlines thereby establishing surface points at each such intersection;
associating nominal surface data with each surface point;
defining a set of inspection nominal points that fall on streamlines and cross curves;
measuring an actual blade shape at each inspection nominal point to establish shape deviation data; and
interpolating the shape deviation data with reference to the surface points.

18. A method for restoring a worn edge of an airfoil comprising the steps of:
machining away damaged material from a damaged airfoil edge so as to expose a weld surface;
defining a set of streamlines on the airfoil surface;
defining a set of cross curves that intersect one or more of the streamlines thereby establishing surface points at each such intersection;
associating nominal surface data with each surface point;
defining a set of inspection nominal points that fall on streamlines and cross curves;
measuring the damaged airfoil edge at the weld surface using a CMM system to generate a plurality of component measurements;
interpolating the shape deviation data with reference to the surface points so as to create a first deformation geometry based on the plurality of component measurements;
converting the first deformation geometry to a welding system operable code;
depositing a filler material on the weld surface according to the first deformation geometry so as to create a weld-repaired airfoil;
automatically measuring the dimensions of the airfoil using a CMM system at each inspection nominal point to establish shape deviation data;
interpolating the shape deviation data with reference to the surface points so as to create a second deformation geometry;
converting the second deformation geometry to a machine operable code;
machining the component according to the second deformation geometry; and
hand finishing the airfoil.

19. The method according to claim 18 wherein the step of machining the component further comprises machining the component so as to leave less than 0.005 inch of material stock on.

20. The method according to claim 18 further comprising the step of transferring the first deformation geometry to an automated welding computer to generate a tool path using software, and transferring the second deformation geometry to an automated machining computer to generate a tool path using machining software.

* * * * *

UNITED STATES PATENT AND TRADEMARK OFFICE
CERTIFICATE OF CORRECTION

PATENT NO.        : 7,797,828 B2                                                Page 1 of 1
APPLICATION NO.   : 11/413706
DATED             : September 21, 2010
INVENTOR(S)       : Beeson et al.

It is certified that error appears in the above-identified patent and that said Letters Patent is hereby corrected as shown below:

Title Page, item [57]
Under Abstract line 7, "date" should be changed to --data--.

Signed and Sealed this

Twenty-first Day of December, 2010

David J. Kappos
*Director of the United States Patent and Trademark Office*